(12) United States Patent
Lee et al.

(10) Patent No.: US 9,967,839 B2
(45) Date of Patent: May 8, 2018

(54) METHOD AND APPARATUS FOR SYNCHRONIZING PHYSICAL LAYER LINK CHANNEL

(71) Applicant: ELECTRONICS AND TELECOMMUNICATIONS RESEARCH INSTITUTE, Daejeon (KR)

(72) Inventors: Jae-Ho Lee, Daejeon (KR); Jin Tae Oh, Daejeon (KR); Woong Shik You, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 88 days.

(21) Appl. No.: 15/175,172

(22) Filed: Jun. 7, 2016

(65) Prior Publication Data
US 2017/0215162 A1   Jul. 27, 2017

(30) Foreign Application Priority Data

Jan. 21, 2016  (KR) .................. 10-2016-0007577

(51) Int. Cl.
*H04W 56/00*   (2009.01)
*H04L 27/34*   (2006.01)
*H04L 27/26*   (2006.01)
*H04W 72/04*   (2009.01)

(52) U.S. Cl.
CPC ..... *H04W 56/0005* (2013.01); *H04L 27/2601* (2013.01); *H04L 27/34* (2013.01); *H04W 72/04* (2013.01)

(58) Field of Classification Search
CPC .. H04W 56/0005; H04W 72/04; H04L 27/34; H04L 27/2601
See application file for complete search history.

(56) References Cited

U.S. PATENT DOCUMENTS 7,515,582 B2 * 4/2009 Wang ................. H04L 27/2662
370/350
9,294,327 B2   3/2016 Kim et al.
(Continued)

FOREIGN PATENT DOCUMENTS

KR  10-2006-0067715   6/2006
KR  10-2014-0124597   10/2014

OTHER PUBLICATIONS

Chang-Bok Joo et al., "A Symbol Synchronization Detection by Difference Method for OFDM Systems"; 2006-43TC-2-9, Feb. 2006.

*Primary Examiner* — Brian D Nguyen
(74) *Attorney, Agent, or Firm* — Kile Park Reed & Houtteman PLLC

(57) ABSTRACT

Provided herein is a PLC synchronization method including allocating a predetermined value with respect to a plurality of modulation symbols depending on whether sum of squared magnitude of in-phase component and orthogonal component is arranged in a predetermined range, calculating first moving sum and second moving sum of a value allocated to the plurality of modulation symbols, and performing PLC (physical layer link channel) synchronization based on the plurality of modulation symbols having maximum value of the first moving sum and the second moving sum.

17 Claims, 10 Drawing Sheets

(56) References Cited

U.S. PATENT DOCUMENTS

| | | | |
|---|---|---|---|
| 2002/0145547 A1* | 10/2002 | May | H03H 17/0621 341/61 |
| 2006/0093076 A1* | 5/2006 | Lee | H04L 27/2657 375/343 |
| 2006/0222094 A1* | 10/2006 | Makhlouf | H04L 25/0224 375/260 |
| 2007/0025457 A1* | 2/2007 | Wang | H04L 27/2662 375/260 |
| 2008/0084816 A1* | 4/2008 | Wang | H04L 27/2607 370/208 |
| 2011/0013737 A1 | 1/2011 | Lee et al. | |
| 2012/0207080 A1 | 8/2012 | Chang et al. | |

* cited by examiner

FIG. 8

| subcarrier index | boundary mapping | LIMITER OUTPUT AFTER FIRST MOVING SUM |
|---|---|---|
| 2716 | 1 | |
| 2717 | 1 | |
| 2718 | 1 | |
| 2719 | 1 | |
| 2720 | 1 | |
| 2721 | 1 | |
| 2722 | 1 | |
| 2723 | 1 | 6 |
| 2724 | 1 | 8 |
| 2725 | 1 | 8 |
| 2726 | 1 | 6 |

PLC Preamble j=0

| subcarrier index | boundary mapping | LIMITER OUTPUT AFTER FIRST MOVING SUM |
|---|---|---|
| 6516 | 1 | |
| 6517 | 1 | |
| 6518 | 1 | |
| 6519 | 1 | |
| 6520 | 1 | |
| 6521 | 1 | |
| 6522 | 1 | |
| 6523 | 1 | 6 |
| 6524 | 1 | 8 |
| 6525 | 1 | 6 |
| 6526 | 1 | 6 |

PLC Preamble j=1

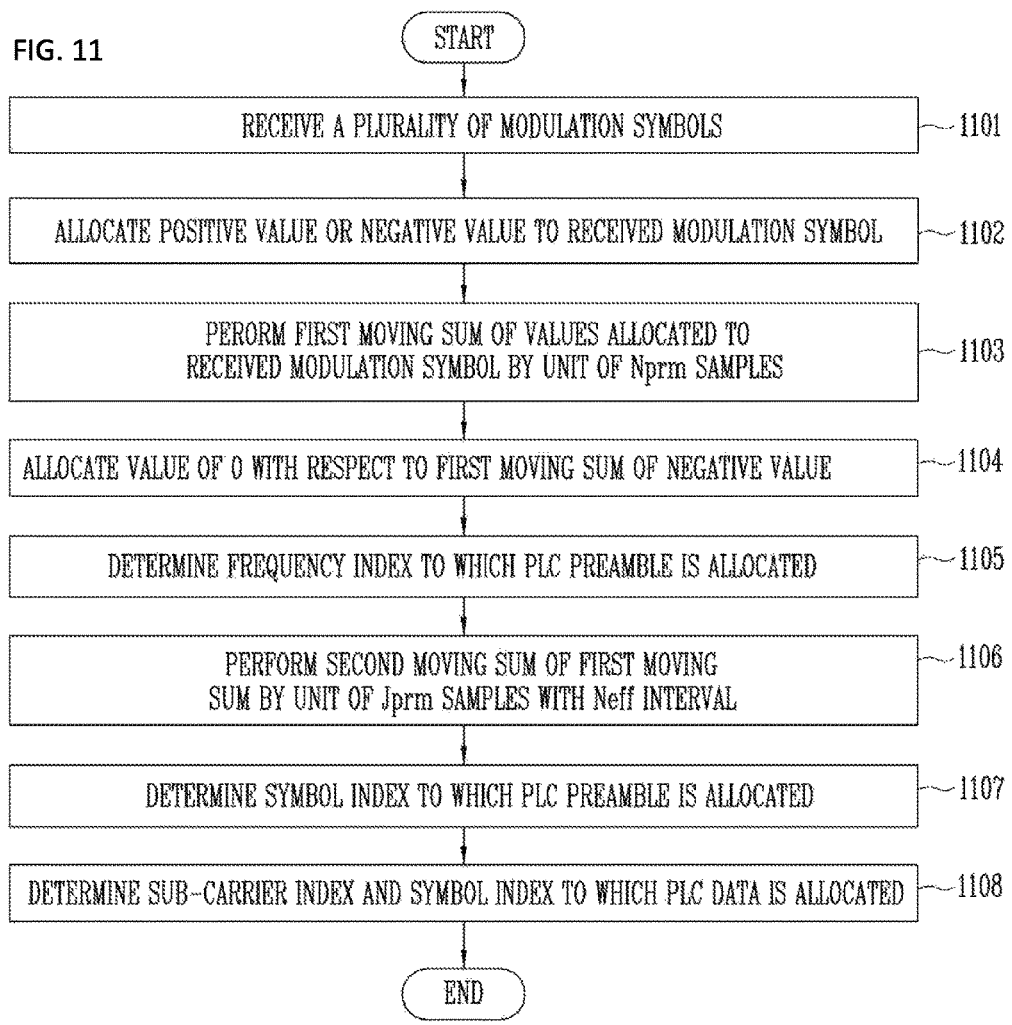

METHOD AND APPARATUS FOR SYNCHRONIZING PHYSICAL LAYER LINK CHANNEL

CROSS-REFERENCE TO RELATED APPLICATION

The present application claims priority to Korean patent application number 10-2016-0007577, filed on Jan. 21, 2016, the entire disclosure of which is incorporated herein in its entirety by reference.

BACKGROUND

Field of Invention

Various embodiments of the present invention relate to a method and an apparatus for synchronizing a physical layer link channel.

Description of Related Art

Recently, DOCSIS 3.1 (data over cable service interface specifications 3.1) standard for data transmission up to 10 Gbps through cable networks has been under development. The DOCSIS 3.1 has attracted attention for having key technology which enables existing cable networks to transmit data up to 10 Gbps without an optical cable.

The DOCSIS 3.1 is different from the conventional version of DOCSIS in light of a channel error correction method and a modulation method. The DOCSIS 3.1 adopts an OFDM method (orthogonal frequency division multiplexing) which is a multi-carrier transmission method, thereby improving spectral efficiency more than 50% by applying downlink maximum 4096 QAM and uplink maximum 1024 QAM for each sub-carrier. The multi-carrier system using the OFDM may perform symbol synchronization and channel equalization with comparative ease in comparison with a single carrier, and have the advantage of using a portion of a plurality of sub-carriers constituting a frequency band for transmission and reception control.

In DOCSIS 3.1, the frequency band for transmission of upstream and downstream transmission has been extended for broadband channel transmission and transmission up to 10 Gbps. Since the extended frequency band corresponds to a range in which a conventional single carrier channel is available, it becomes impossible to receive the channel only by frequency tuning in the DOCSIS 3.1.

Thus, the DOCSIS 3.1 may provide a sub-channel in a particular structure in a broadband channel for receiving downlink wide-area channel. The above is referred to as PLC (physical layer link channel). The PLC may be allocated to a portion of sub-carriers used for control among a plurality of sub-carriers constituting the frequency band. The PLC may transmit is a time stamp for system operation of a receiver, power management information, downlink channel operational profile definition information and multi-carrier channel information, the number of sub-carriers used to create an OFDM code from a transmitter, a location of the sub-carrier of a pilot used for timing synchronization and the channel equalization, and modulation parameter, for example, a coding rate of a channel correction encoder. Accordingly, the receiver may gain information regarding entire channels and system information by acquiring a PLC channel prior to receiving entire band, and demodulate and decode the OFDM code receive by using acquired information.

To this end, the receiver should perform PLC synchronization in order to receive the PLC properly.

SUMMARY

Various embodiments of the present invention are directed a method and an apparatus for synchronizing the PLC of searching a sub-carrier in which the PLC is located among N sub-carriers on a frequency axis, and distinguishing PLC preamble and PLC data on a time axis in DOCSIS 3.1 systems.

A PLC synchronization method includes allocating a predetermined value with respect to a plurality of modulation symbols depending on whether sum of squared magnitude of in-phase component and orthogonal component is arranged in a predetermined range, calculating first moving sum and second moving sum of a value allocated to the plurality of modulation symbols, and performing PLC (physical layer link channel) synchronization based on the plurality of modulation symbols having maximum value of the first moving sum and the second moving sum.

A PLC synchronization apparatus includes a boundary mapper receiving a plurality of modulation symbols consisting of in-phase component and orthogonal component and allocating an arbitrary value depend on whether sum of squared magnitude of in-phase component and squared magnitude of orthogonal component of the plurality of modulation symbols is in a predetermined range, a moving sum calculation unit calculating first moving sum and second moving sum by using an output value of the boundary mapper, and a determination unit determining PLC preamble and PLC data based on an output value of a first moving sum calculation unit and a second moving sum calculation unit.

BRIEF DESCRIPTION OF THE DRAWINGS

FIG. 8 is a diagram illustrating a table presenting an example of an output value of a limiter.

FIG. 11 is a flow chart illustrating a PLC synchronization method according to the present disclosure.

DETAILED DESCRIPTION

When the well-known functions and configurations in the following description of the embodiments of the present disclosure distract the subject matter of the present disclosure, the detailed description thereof may be omitted.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the invention. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, a singular form may include a plural from as long as it is not specifically mentioned in a sentence Hereinafter, embodiments will be described in greater detail with reference to the accompanying drawings.

Figure 1:
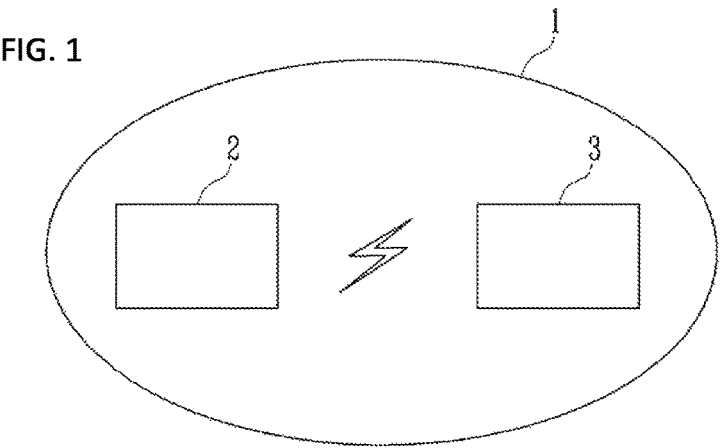
FIG. 1 is a diagram illustrating a network system to which the present disclosure is applied.

FIG. 1 is a diagram illustrating a network system to which the present disclosure is applied.

Referring to FIG. 1, a network system 1 to which the present disclosure is applied includes a transmitter 2 and a receiver 3.

The transmitter 2 and receiver 3 may be connected through a cable network, and the transmitter 2 and receiver 3 may transmit and receive data through the cable network in an orthogonal frequency division multiplexing (OFDM).

In the various embodiments of the present disclosure, the receiver 3 may apply a BCH (Bose, Chaudhuri, and Hocquenghem) code and a LDPC (low density parity check) code as a channel error correction method with respect to a downlink channel received from the transmitter 2. The transmitter 2 and receiver 3 may apply the LDPC code with respect to an uplink channel received from the receiver 3.

The transmitter 2 may allocate a portion of N sub-carriers constituting a downlink channel frequency band into a control channel and transmit the PLC to the receiver 3 via the control channel. The downlink channel transmitted from the transmitter 2 to the receiver 3 may have configuration of a radio frame as shown in FIG. 2.

Figure 2:
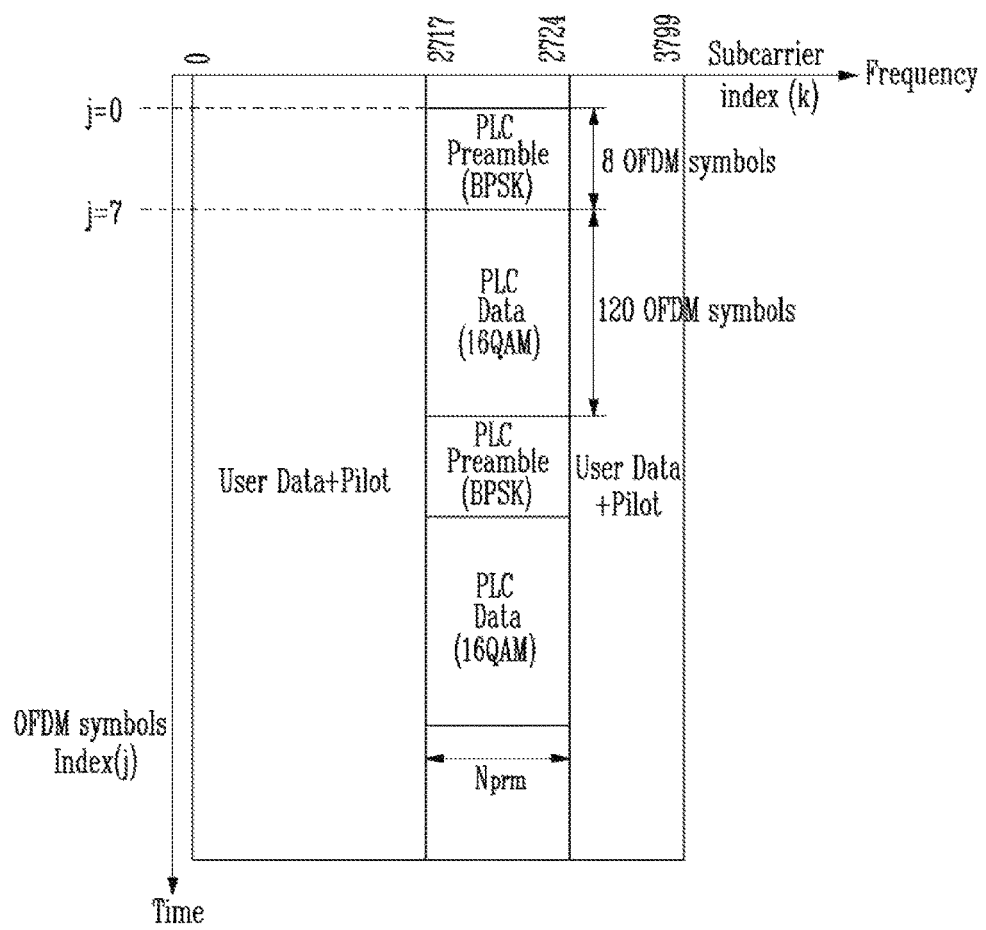
FIG. 2 is a block diagram illustrating a radio frame configuration of a network system to which the present disclosure is applied.

Referring to FIG. 2, the PLC may be allocated into arbitrary Nprm sub-carriers among remaining sub-carriers, except for the sub-carriers allocated in guard bands of total N sub-carriers on a frequency axis. In the embodiment, when the number of used sub-carriers is 4K-FFT, the PLC may be allocated into 8 sub-carriers, and when the number of used sub-carriers is 8K-FFT, the PLC may be allocated to 16 sub-carriers.

FIG. 2 describes the case where the number of sub-carrier number (Neff) used for actual data transmission, except for 296 sub-carriers allocated to the guard band among total 4096 sub-carriers, is 3800. The PLC may be positioned in any of the sub-carriers of 3800 sub-carriers, and FIG. 2 shows an example where the PLC is allocated to Nprm=8 subcarriers of sub-carrier index from k=2717 to k=2724.

Referring to FIG. 2, the PLC may be allocated to 128 symbols on the time axis. A PLC preamble may be allocated to J symbols and PLC data may be allocated to remaining 128-Jprm symbols. In FIG. 2, the PLC preamble may be allocated to 8 symbols, and the PLC data may be allocated to remaining 120 symbols.

The PLC data may include a variety of control information, for example, the PLC data may include modulation parameters such as the number of sub-carriers used to create a code, a location of the sub-carrier of the pilot used for timing synchronization and channel equalization, and the coding rate of the channel correction encoder.

In FIG. 2, it is exemplified that the PLC preamble is allocated to Jprm=8 symbols of symbol index from j=0 to j=7.

The PLC preamble may be modulated according to a BPSK method. The OFDM symbol of the PLC preamble may have a value of +1 or a value of −1. The PLC data may be modulated by 16 QAM method.

The receiver 3 may distinguish the sub-carrier index to which the PLC is allocated and distinguish the PLC preamble and the PLC data within said sub-carrier index by performing synchronization in the PLC. And The receiver 3 may obtain the control information from the PLC data. The receiver 3 may demodulate and decode the OFDM code based on the obtained information.

Figure 3:
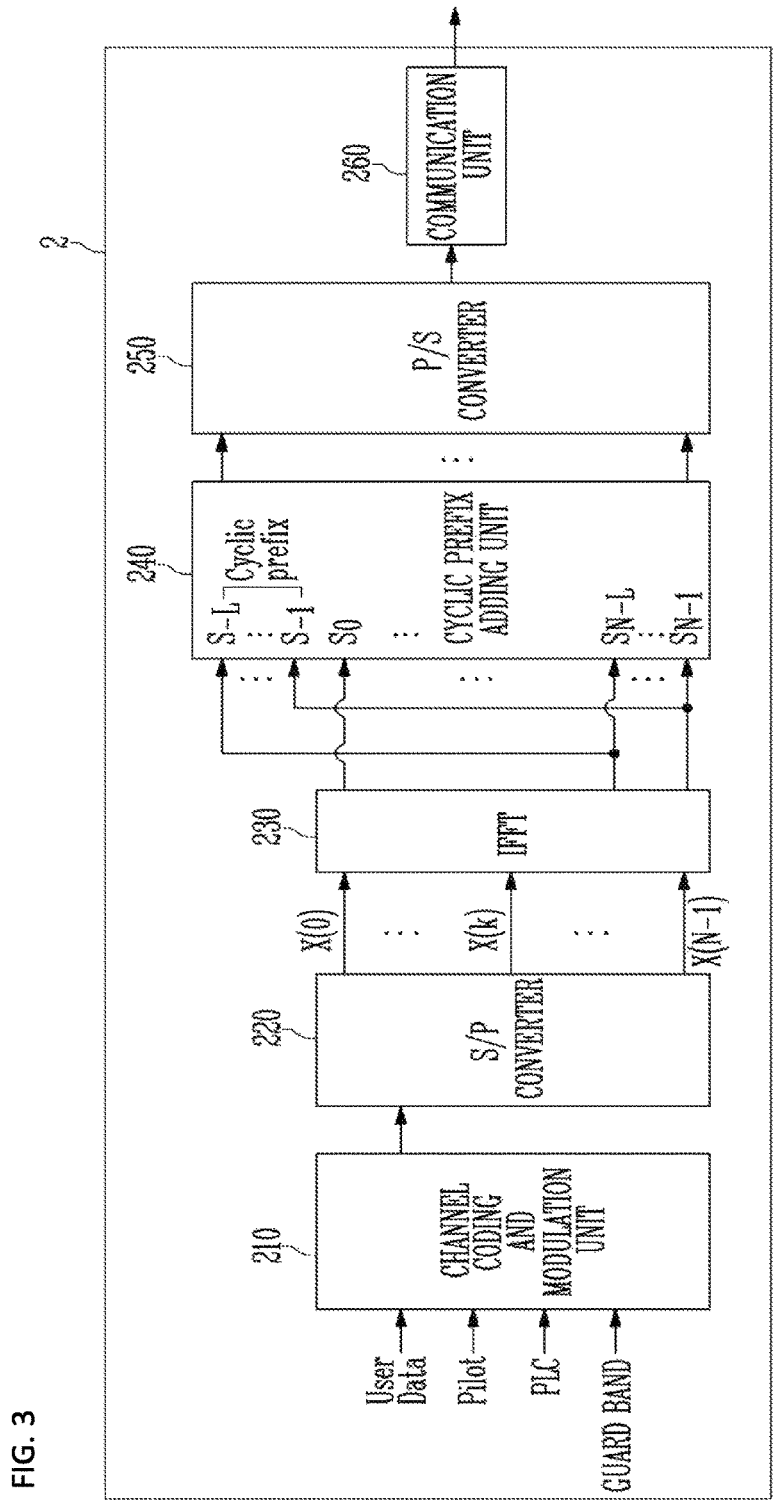
FIG. 3 is a block diagram illustrating a structure of a transmitter according to the present disclosure.

FIG. 3 is a block diagram illustrating a structure of a transmitter according to the present disclosure Referring to FIG. 3, the transmitter 2 according to the present invention may include the channel coding and modulation unit 210, S/P (serial-to-parallel) converter 220, N size IFFT (Inverse Fast Fourier Transform) 230, a cyclic prefix adding unit 240, and a P/S converter 250.

The channel coding and modulation unit 210 may receive input data stream, apply coding (for example, LDPC coding), and generate a sequence of frequency domain modulation symbols (QAM symbols) by modulating input bits. The input bits may be modulated by a QAM (Quadrature Amplitude Modulation) method. In various embodiments, the channel coding and modulation unit 210 may receive and modulate the pilot for symbol synchronization and channel equalization, the PLC data for the guard band, which is for interference control between the channels adjacent to one another and cannel, and channel control. In the channel coding and modulation unit 210, the PLC preamble may be modulated by BPSK method, and the PLC data may be modulated by the 16 QAM scheme.

A S/P converter 220 may generate N parallel symbol streams by converting (demultiplexing) serial modulated symbols to parallel data. N may be the size of IFFT 230, and correspond to the number of sub-carriers constituting the downlink channel frequency band. The IFFT 230 may perform IFFT operation on the N parallel symbol streams to generate time-area signals. The cyclic prefix adding unit 240 may insert a cyclic prefix to the time-area signals. A P/S converter 250 may convert (multiplexing) the parallel time-area output signals at which cyclic prefix is added and generate a serial time-area code.

The constituent elements described above may be configured as a control unit in the transmitter 2.

A communication unit 260 may modulate generated serial time-area code into radio frequency and transmit the code to the receiver 3 through the radio channel. To this end, the communication unit 260 may include a frequency uplink converter (up-converter; UC), and the like.

Figure 4:
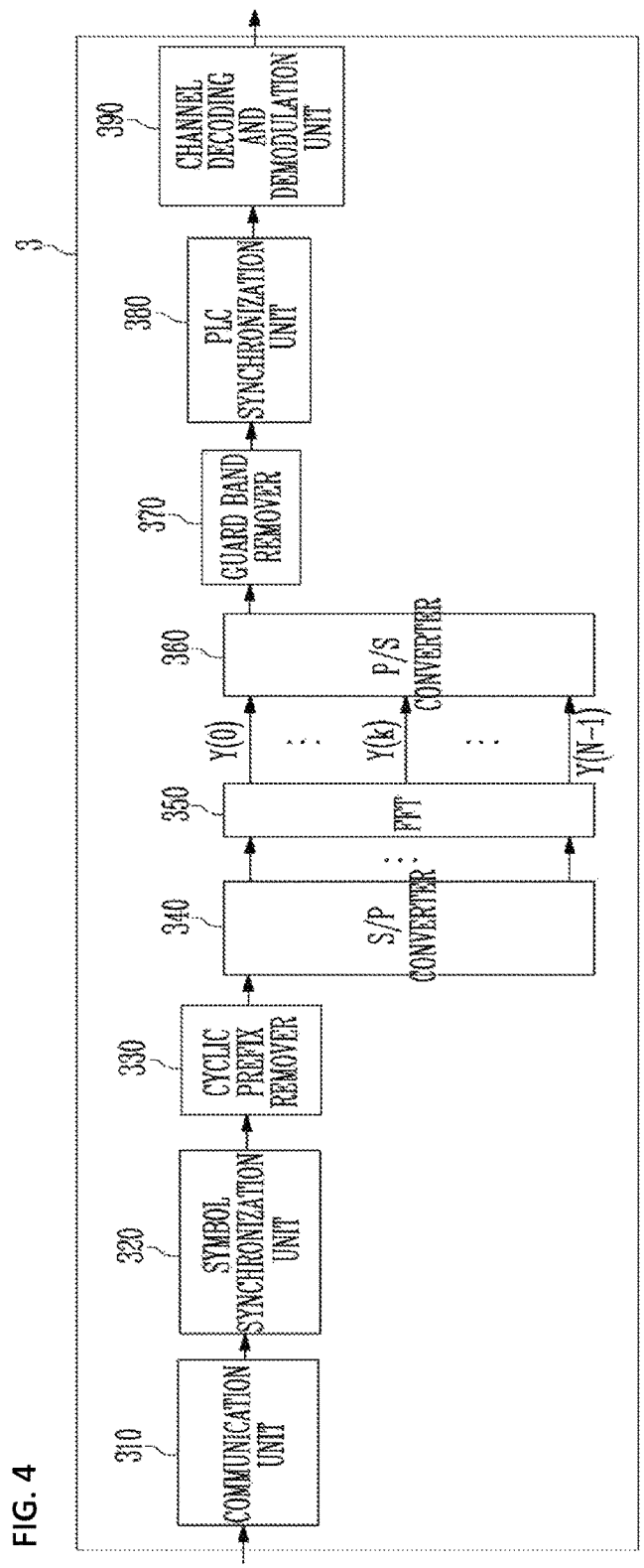
FIG. 4 is a block diagram illustrating a structure of a receiver according to the present disclosure.

FIG. 4 is a block diagram illustrating a structure of a receiver according to the present disclosure.

Referring to FIG. 4, the receiver 3 according to the present invention may include a communication unit 310, a symbol synchronization unit 320, a cyclic prefix remover 330, a S/P converter 340, a N-size FFT 350, a P/S converter 360, a guard band remover 370, a PLC synchronization unit 380 and a channel decoding and demodulation 390.

The communication unit 310 may downlink convert the code received through the radio channel to a baseband frequency. To this end, the communication unit 310 may include a frequency downlink converter.

The symbol synchronization section 320 may obtain the symbol synchronization by using the cyclic prefix of the signal received through the channel. The cyclic prefix remover 330 may remove the cyclic prefix from the received signal to generate the serial time-area baseband code. The S/P converter 340 may convert the time-area baseband code to the parallel time area code. The FFT 350 may perform FFT algorithm to generate N parallel frequency-area codes. A P/S converter 360 may convert the parallel frequency-area codes to a sequence of frequency-area modulation symbols. The guard band remover 370 may remove the modulation symbols corresponding to the guard band on the sequence of modulation symbols.

The PLC synchronization section 380 may identify the PLC preamble and PLC data in the modulation symbols by synchronizing the PLC according to the present invention. The channel decoding and demodulation unit 390 may demodulate the modulation symbols to recover original input data stream. The channel decoding and demodulation unit 390 may receive the channel information from the PLC preamble and the PLC data identified in the PLC synchronization section 380, and demodulate the modulation symbol based on the received channel information.

Constituent elements described in the receiver 3 may be configured as one control unit.

Figure 5:
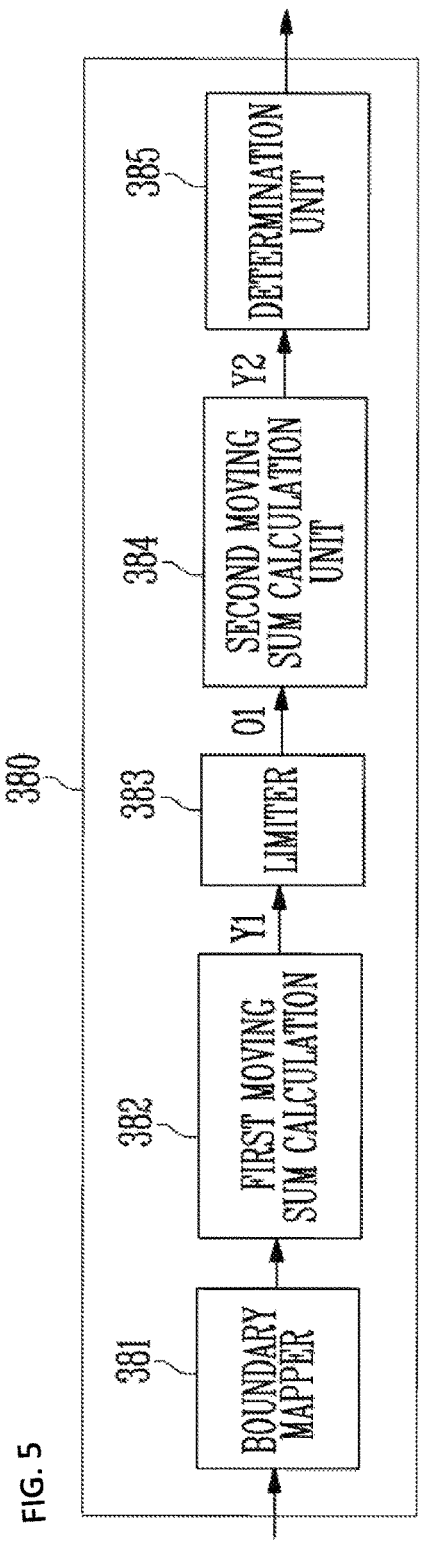
FIG. 5 is a diagram illustrating a structure of a PLC synchronizing unit in more detail according to the present disclosure.

FIG. 5 is a diagram illustrating a structure of a PLC synchronizing unit in more detail according to the present disclosure.

Referring to FIG. 5, the PLC synchronization section 380 may include a boundary mapper 381, a first moving sum calculation unit 382, a limiter 383, a second moving sum calculation unit 384, and a determination unit 385.

The PLC synchronization unit 380 may receive the modulation symbols output from the guard band remover 370. Each of the modulation symbol may have index n, the modulation symbol index n may be determined as the following equation 1 from the sub-carrier index k of to which the modulation symbols are allocated and the symbol index j of.

$$n = k + 3800 \times j \qquad \text{[Equation 1]}$$

The modulation symbols input to the PLC synchronization unit 380 may include each component of two carriers having a phase difference of 90°, that is, I signal of in-phase component and Q signal of orthogonal component. In addition, phase rotation may occur in the modulation symbols including the PLC preamble due to symbol timing offset.

Figure 6:
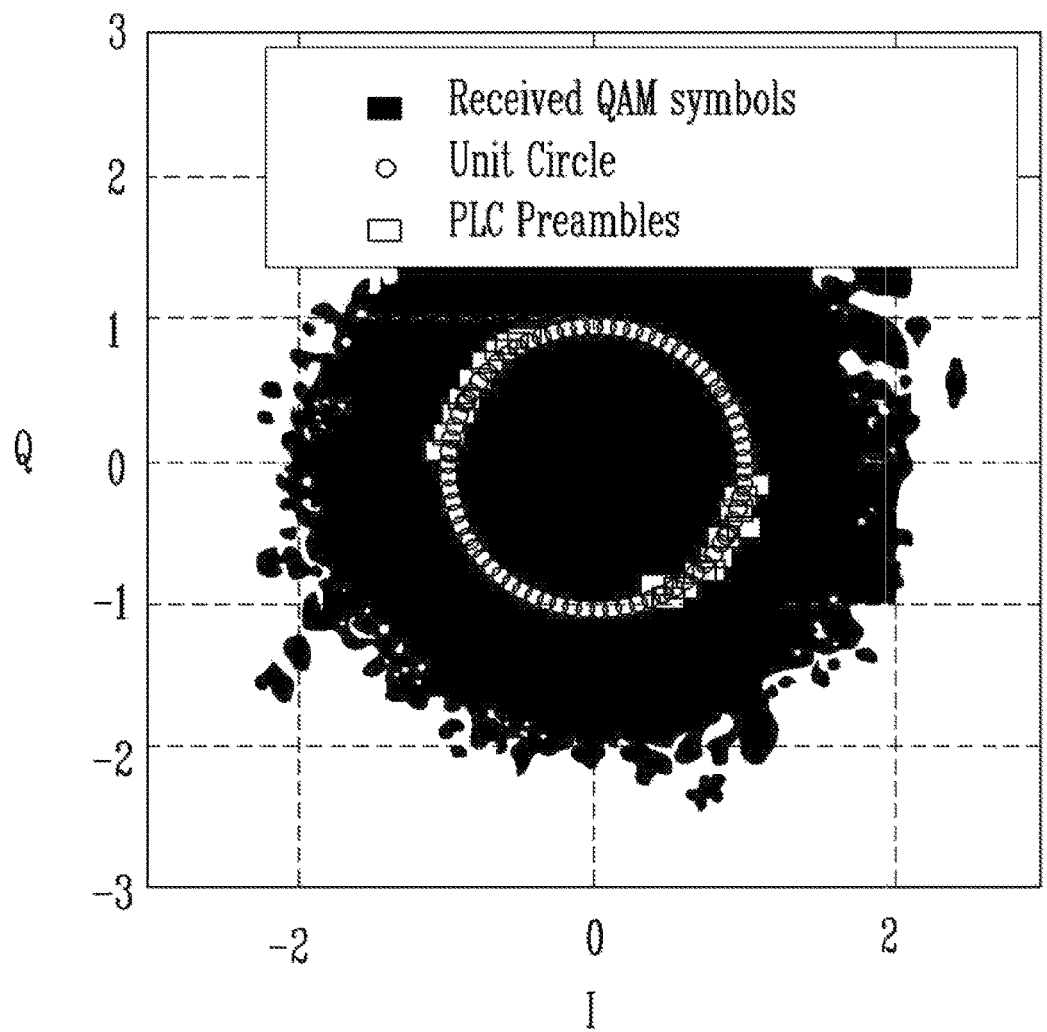
FIG. 6 is a diagram illustrating an example of graph Q-I of a modulation symbol input to a synchronizing unit.

FIG. 6 illustrates the modulation symbols that the PLC synchronization PLC unit 380 receives, when indicating the Q signal and I signal on the x axis and the y axis, respectively. Among the modulation symbols illustrated in FIG. 6, since the PLC preamble is modulated by the BPSK method, the modulation symbols of the PLC preamble may be arranged in a specific area (shown in a square) in which the value of $I^2+Q^2$ is 1 in consideration of the phase rotation.

The boundary mapper 381 may allocate the value of +1 with respect to the modulation symbols arranged on the circle unit of the received modulation symbols and the value of −1 to the other modulation symbols. In other words, the boundary mapper 381 may allocate the value of +1 with respect to the modulation symbols in which sum of the squared magnitude of the in-phase component and orthogonal components is arranged in a predetermined range and the value of −1 to the other modulation symbols.

To this end, the boundary mapper 381 may remove the phase components by calculating the value of $I^2+Q^2$ of the input modulation symbol, and output the value of +1 with respect to the modulation symbol corresponding to the value of 1. The boundary mapper 381 may allocate the value of +1 when the modulation symbol is arranged within a predetermined range from the circle unit, even though the modulation symbol is not accurately located on the circle unit.

In more detail, the boundary mapper 381 may determine whether the value of $I^2+Q^2$ of the modulation symbols are arranged in the range of 1−T/2 to 1+T/2, and allocate the value of +1 with respect to the modulation symbols arranged in the corresponding rage, and the value of −1 with respect to the remaining modulation symbols. T is a predetermined value set in advance in order to define the acceptable range that the corresponding modulation symbol is located on the circle unit.

As a result, the value of x(n) output from the boundary mapper 381 may have the value of +1 or the value of −1 depending on the value of $I^2+Q^2$ of the modulation symbols.

The first moving sum calculation unit 382 may calculate the moving sum by the unit of Nprm samples on the frequency axis with respect to the values output from the boundary mapper 381. The output value of the first moving sum calculation unit 382 according to the moving sum may be represented as following Equation 2.

$$Y1(l) = \sum_{n=l}^{l+Nprm-1} x(n), l = 0, 1, 2, \ldots \qquad \text{[Equation 2]}$$

l may be sample index of moving sum. Y1(l) may be the output value of first moving sum calculation unit 382, and x(n) may be the output value of the boundary mapper 381.

Since the output value of the boundary mapper 381 has the value of +1 or the value of −1, the output value of the first moving sum calculation unit 382 has a range of the value of −Nprm to the value of +Nprm. The output value of the first moving sum calculation unit 382 may have the maximum value of +Nprm when performing moving sum Nprm sub-carriers to which the PLC preambles are allocated.

The limiter 383 may reduce a code bit of a subsequent calculation on the sub-carriers to which the PLC preamble is not allocated, and the complexity of the hardware by allocating the value of 0 with respect to the negative output value of the first moving sum calculation unit 382.

The output value of the limiter 383 may be represented as following Equation 3.

$$Q1(l) = \begin{cases} Y1(l), & \text{when } Y1(l) > 0 \\ 0, & \text{else} \end{cases}, l = 0, 1, 2, \ldots \qquad \text{[Equation 3]}$$

l may be the sample index of the first moving sum calculation unit 382. Q1(l) may be the output value of the limiter 383, and Y1(l) may be the output value of the first moving sum calculation unit 382.

Figure 7:
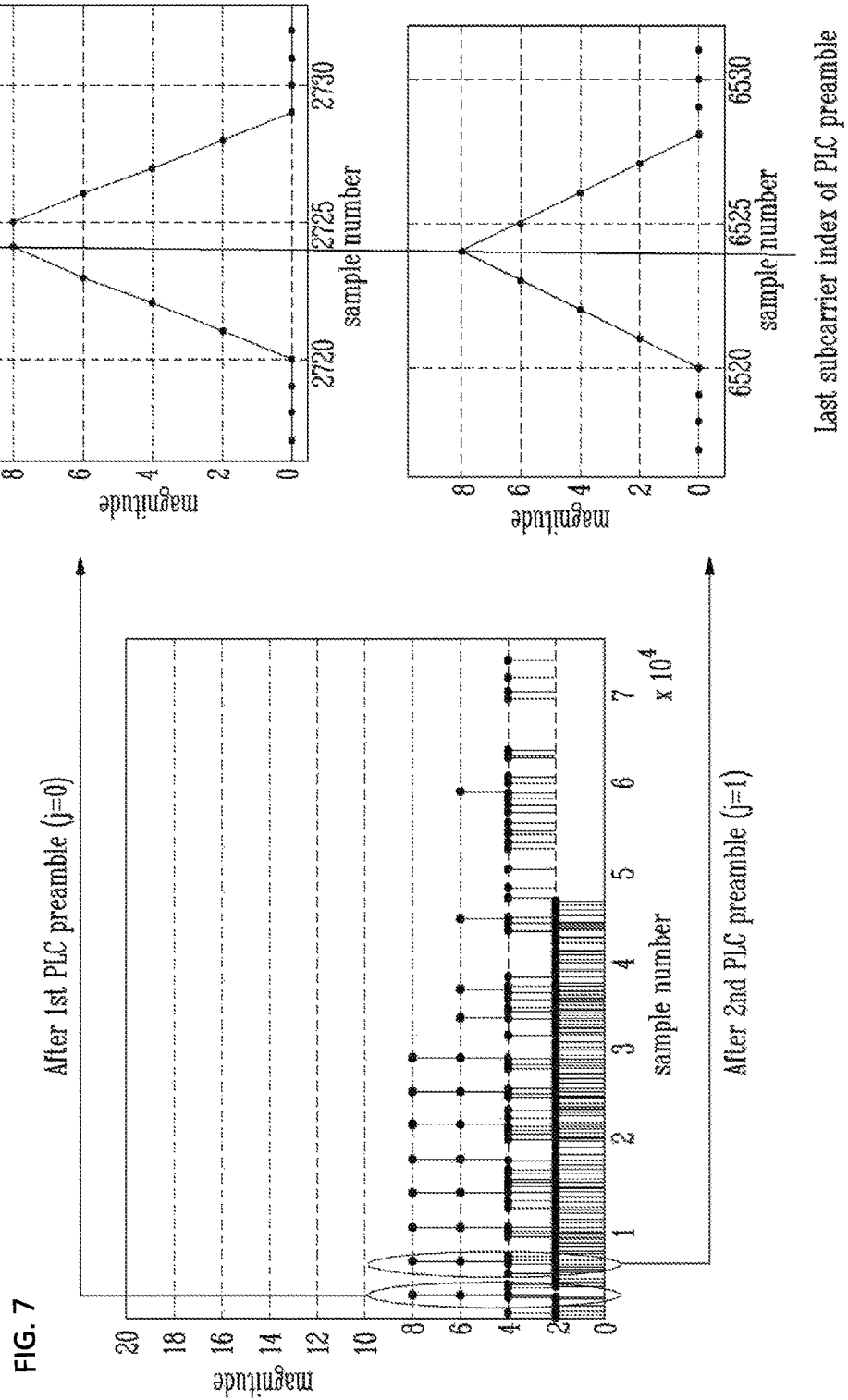
FIG. 7 is a diagram illustrating an example of an output value of a limiter.

FIG. 7 is a diagram illustrating an example of an output value of a limiter. As shown in the above, the output value of the limiter 383 may have the maximum value of +Nprm in connection with Nprm sub-carriers to which the PLC preambles are allocated. Accordingly, when the PLC preambles are allocated as shown in FIG. 2, the output value of the limiter 383 regarding symbol index j=0 may have the maximum value of 8 in the sample modulation symbol index 2724 (the sub-carrier index 2724 and the symbol index 0) as shown in FIG. 7. In addition, when the PLC preamble is allocated as shown in FIG. 2, the output value of the limiter 383 regarding the symbol index j=1 may have the maximum value of 8 in the sample modulation symbol index 6524 (the sub-carrier index 2724 and the symbol index 1) as shown in FIG. 7.

In FIG. 2, since the PLC preamble is allocated in the interval of 8 symbol intervals from symbol index 0 to symbol index 7, in FIG. 7 the maximum value may occur 8 times in 8 symbol intervals.

FIG. 8 is a diagram illustrating a table presenting an example of an output value of the limiter 383.

The second moving sum calculation unit 384 may calculate the moving sum by unit of Jprm samples on the time axis with respect to the values output from the limiter 383. The output value of the second moving sum calculation unit 384 may be represented in the following equation 4.

$$Y2(l) = \sum_{i=0}^{Jprm-1} O1(l + 3800 \times i), l = 0, 1, 2, \ldots, i = 0, 1, \ldots \quad \text{[Equation 4]}$$

l may be the sample index of the output value of the limiter 383. i may be the OFDM symbol index. Y2(l) may be the output value of the second moving sum calculation unit 384.

The determination unit 385 may determine the sample index corresponding to the maximum value among the output values of the second moving sum calculation unit 384. The determination unit 385 may output the information regarding the PLC by determining the PLC preamble area and the PLC data area based on the sample index.

Since the output value of limiter 383 may have the range from 0 to +Nprm, the output value of the second moving sum calculation unit 384 may have the value of 0 to +Jprm×Nprm. The output value of the second moving sum calculation unit 384 may have the maximum value of +Jprm×Nprm when performing the moving sum of the time axis to which the PLC preamble is allocated.

Figure 9:
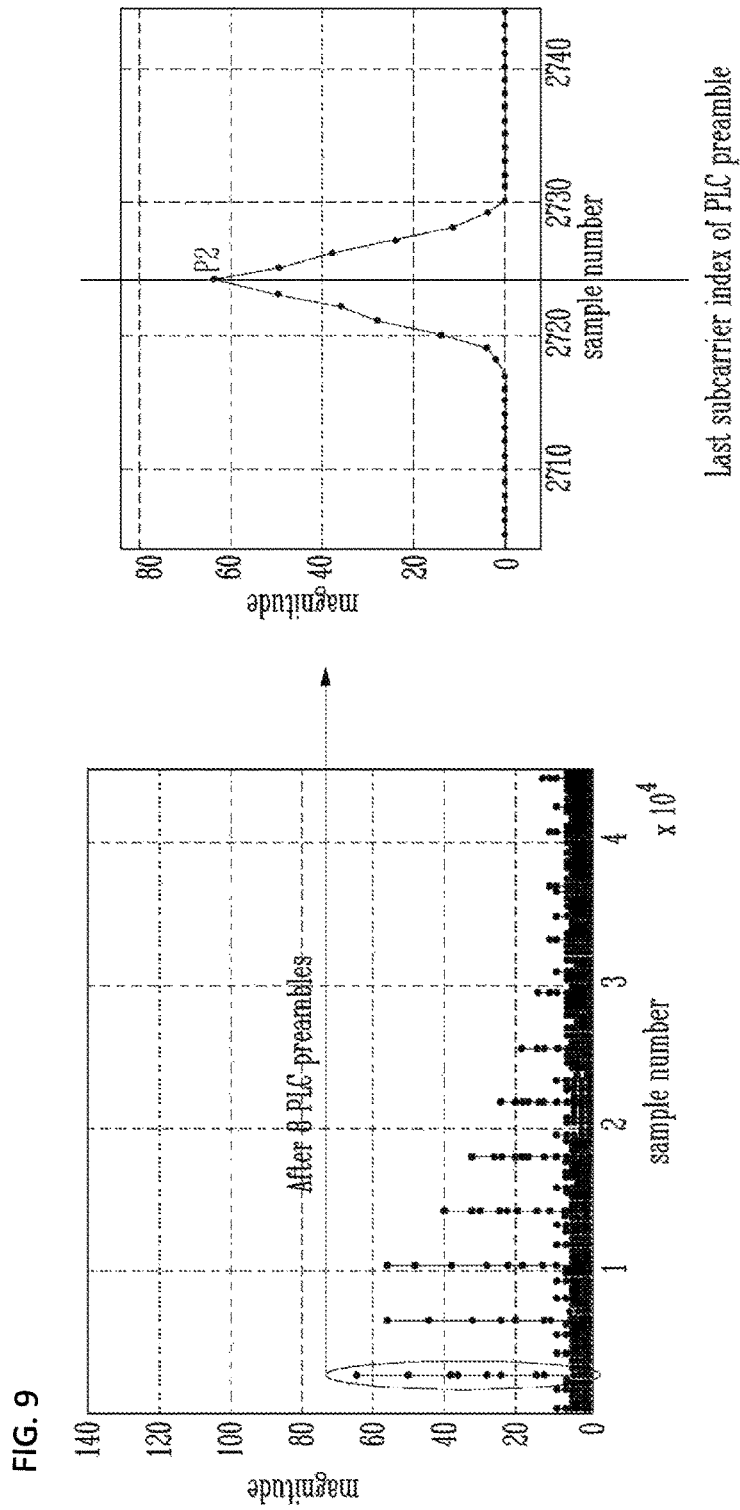
FIG. 9 is a diagram illustrating an example of an output value of a second moving sum calculation unit.

FIG. 9 is a diagram illustrating an example of an output value of a secondary moving sum calculation unit.

When the PLC preamble is allocated as shown in FIG. 2 PLC, the output value of the second moving sum calculation unit 384 may have the maximum value of 64 in the sample modulation symbol index 2724 as shown in FIG. 9. Thus, the determination unit 385 may identify that the sub-carrier index to which the PLC preamble is allocated is from 2717 to 2724, and the symbol index to which the PLC preamble is allocated is from 0 to 7. The PLC data may be allocated to the sub-carrier index same with the PLC preamble, and a symbol subsequent to the symbol to which the PLC preamble is allocated to 120 symbols. Therefore, the determination unit 385 may identify that the sub-carrier index to which the PLC data is from 2717 to 2724, and the symbol index to which the PLC data is allocated is from 8 to 127.

In various embodiments, the determination unit 385 may select the output value exceeding a predetermined threshold among the output value of the second moving sum calculation unit 384, and determine the maximum value from the selected output value. In the embodiment where the PLC preamble is allocated as shown in FIG. 2, the threshold value may be 60.

Figure 10:
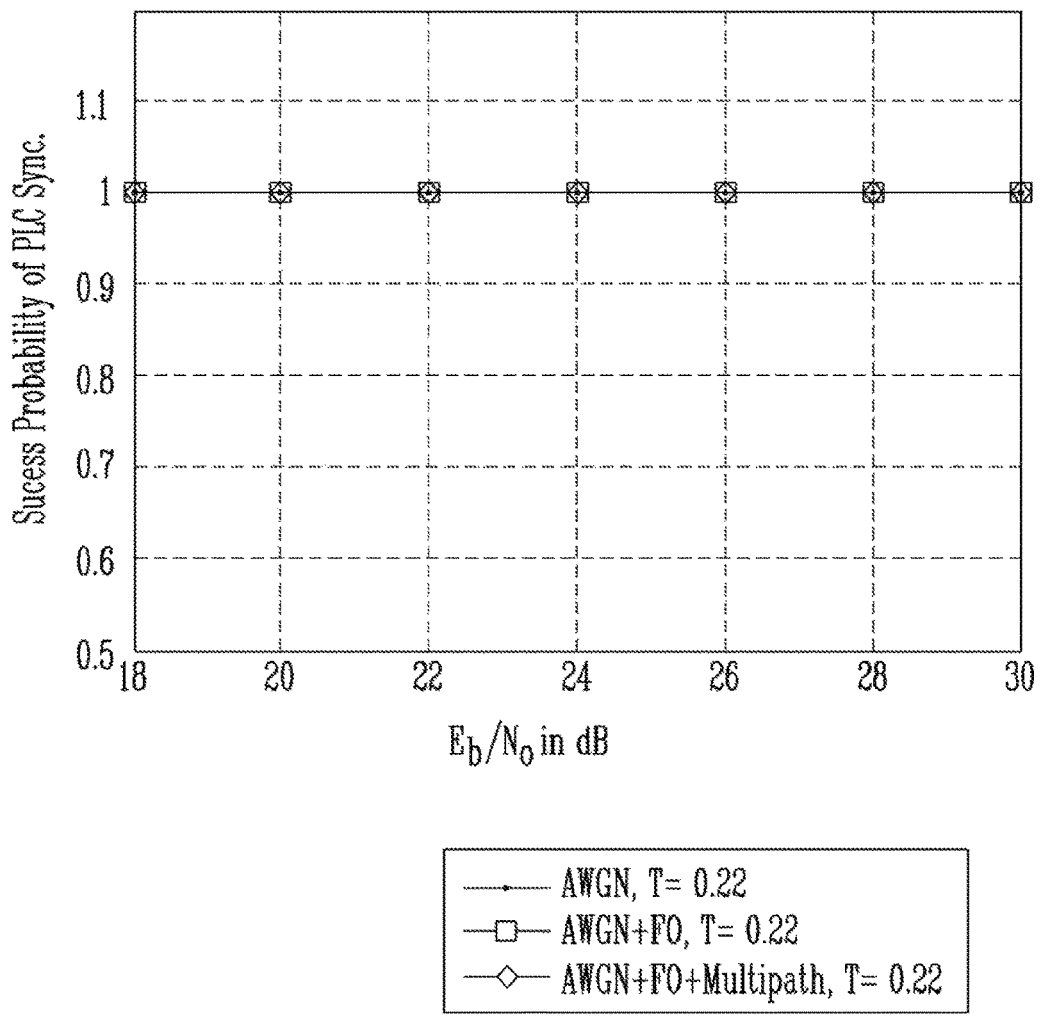
FIG. 10 is a diagram illustrating a result of simulation of a PLC synchronization unit.

FIG. 10 is a diagram illustrating a result of simulation of a PLC synchronization unit. Referring to FIG. 10, the PLC synchronization with respect to multi-paths is normally performed in the AWGN (additive white gaussian noise) and FO (frequency offset) environment.

FIG. 11 is a flow chart illustrating a PLC synchronization method according to the present disclosure Referring to FIG. 11, the PLC synchronization unit 380 according to the present disclosure may receive a plurality of PLC modulation symbols 1101. Each modulation symbol may have index n, and the modulation symbol index n may be determined as shown in Equation 1 from the sub-carrier index k and the symbol index j to which the modulation symbols are allocated. In addition, the modulation symbols may include each component of two carriers having a phase difference of 90°, that is, I signal of in-phase component and Q signal of orthogonal component.

Subsequently, the PLC synchronization unit 380 may allocate the value of +1 with respect to the modulation symbols in which sum of the squared magnitude of the in-phase component and orthogonal components is arranged in a predetermined range and the value of −1 to the other modulation symbols 1102. In other words, the PLC synchronization unit 380 may determine whether the value of $I^2+Q^2$ of the modulation symbols are arranged in the range of 1−T/2 to 1+T/2, and allocate the value of +1 with respect to the modulation symbols arranged in the corresponding range, and the value of −1 with respect to the remaining modulation symbols.

Subsequently, the PLC synchronization unit 380 may perform the first moving sum by unit of Nprm samples with respect to the modulation symbols 1103. Nprm is the number of sub-carrier index to which the PLC is allocated in the network system where the PLC synchronization unit 380 operates.

The PLC synchronization unit 380 may assign the value of 0 for the negative value of the first moving sum 1104.

The PLC synchronization unit 380 may determine the frequency index in which the PLC preamble is allocated based on the Nprm modulation symbols having the maximum value of the first moving sum 1105.

In various embodiments, the determining of the frequency index in which the PLC preamble is allocated 1105 may be performed after the second moving sum 1106 to be described later. In other words, the PLC synchronization unit 380 may perform the first moving sum 1103, the assignment of the value of 0 1104 and the second moving sum 1106, and then determine the frequency index and the symbol index to which the PLC preamble is allocated 1105, 1107.

Subsequently, the PLC synchronization unit 380 may perform the second moving sum of the first moving sum values by unit of Jprm samples with Neff interval 1106. Neff may be the number of sub-carriers used for submitting the actual data in the network system in which the PLC synchronization unit 380 operates and the number of symbol index to which PLC preamble is allocated in the network system where the PLC operation unit 380 operates.

Subsequently, the PLC synchronization unit 380 may determine the symbol index to which the PLC preamble is allocated based on the 8 modulation symbols of first moving sum value having the maximum value of the second moving sum 1107.

The PLC synchronization unit 380 may determine the sub-carrier index and the symbol index to which the PLC data is allocated based on the sub-carrier index and the symbol index to which the PLC preamble is allocated 1108.

The received modulation symbols may be demodulated in accordance with the PLC information determined in the PLC synchronization unit 380.

The PLC synchronization method and apparatus according to the invention disclosure may enable data transmission by obtaining accurate synchronization of the PLC in the DOCSIS 3.1 system.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A PLC synchronization method, the method comprising:
    allocating a predetermined value with respect to a plurality of modulation symbols depending on whether sum of squared magnitude of in-phase component and squared magnitude of orthogonal component is arranged in a predetermined range;
    calculating first moving sum and second moving sum values utilizing the predetermined values allocated to the plurality of modulation symbols; and
    performing PLC (physical layer link channel) synchronization based on the plurality of modulation symbols having maximum values of the first moving sum and the second moving sum.

2. The method according to claim 1, wherein the calculating of the first moving sum and the second moving sum comprises:
    performing the first moving sum of the values allocated to the plurality of modulation symbols by unit of first number; and
    performing the second moving sum of the value of the first moving sum by unit of second number with a predetermined interval,
    wherein a primary number indicates a number of sub-carrier index to which a PLC preamble is allocated in a network system, the predetermined interval indicates a number of sub-carrier used for transmitting actual data in the network system, and a secondary number is a number of symbol index to which the PLC preamble is allocated in the network system.

3. The method according to claim 2, wherein the allocating of a predetermined value comprises allocating a value of +1 when sum of squared magnitude of in-phase component and squared magnitude of orthogonal component of the modulation symbol is arranged in the predetermined range, and a value of −1 to the other modulation symbols.

4. The method according to claim 2, wherein the performing of the first moving sum comprises calculating an lth first moving sum by accumulating values allocated to the modulation symbols of the first number from an nth modulation symbol, wherein the lth first moving sum corresponds to the nth modulation symbol such that the variables l and n are equal to each other.

5. The method according to claim 2, wherein the performing of the first moving sum comprises allocating the first moving sum to a value of 0 when the first moving sum is a negative value.

6. The method according to claim 2, wherein the performing of the second moving sum comprises calculating lth second moving sum by accumulating the first moving sum with respect to the modulation symbols of the second number with the predetermined interval from an nth modulation symbol.

7. The method according to claim 2, the performing of the PLC synchronization comprises:
    determining sub-carrier index, to which the modulation symbol of the first number having a maximum value of the first moving sum is allocated, as sub-carrier index to which the PLC preamble is allocated; and
    determining symbol index, to which modulation symbol corresponding to first moving sum of the second number having a maximum value of the second moving sum, as symbol index to which the PLC preamble is allocated.

8. The method according to claim 2, wherein the first number is 8, the predetermined interval is 3800, and the second number is 8.

9. A PLC synchronization apparatus, wherein the PLC synchronization apparatus is embodied within a receiver which is connected through a cable network to a transmitter, the PLC synchronization apparatus comprising:
    a boundary mapper receiving a plurality of modulation symbols each consisting of an in-phase component and an orthogonal component and allocating predetermined values depending on whether sum of squared magnitude of the in-phase component and squared magnitude of the orthogonal component of the plurality of modulation symbols is in a predetermined range;
    a moving sum calculation unit calculating first moving sum and second moving sum values utilizing the allocated predetermined values outputted from the boundary mapper; and
    a determination unit determining PLC preamble and PLC data based on an output value of the first moving sum and the second moving sum.

10. The apparatus according to claim 9, wherein the boundary mapper allocates a value of +1 when the sum of squared magnitude of in-phase component and squared magnitude of orthogonal component of the plurality of modulation symbols is in the predetermined range, and a value of −1 otherwise.

11. The apparatus according to claim 10, wherein the moving sum calculation unit comprises:
    a first moving sum calculation unit performing first moving sum of an output of the boundary mapper by unit of first number; and
    a second moving sum calculation unit performing second moving sum of an output of the first moving sum calculation unit by unit of second number with a predetermined interval,
    wherein a primary number indicates a number of sub-carrier index to which PLC preamble is allocated in a network system, the predetermined interval indicates a number of sub-carrier used for transmitting actual data in the network system, and a secondary number is a number of symbol index to which the PLC preamble is allocated in the network system.

12. The apparatus according to claim 11, wherein the predetermined range is a predetermined threshold range based on a value of 1.

13. The apparatus according to claim 11, wherein the first moving sum calculation unit calculates an lth first moving sum by accumulating values allocated to the modulation symbol of the first number from an nth modulation symbol wherein the lth first moving sum corresponds to the nth modulation symbol such that the variables l and n are equal to each other.

14. The apparatus according to claim 11, further comprising a limiter allocating a value of the first moving sum to a value of 0 when an output value of the first moving sum calculation unit is a negative value.

15. The apparatus according to claim 11, wherein the second moving sum calculation unit calculates an lth second moving sum by accumulating the first moving sum with respect to modulation symbols of the second number with the predetermined interval from an nth modulation symbol, wherein the lth first moving sum corresponds to the nth modulation symbol such that the variables l and n are equal to each other.

16. The apparatus according to claim 11, wherein the determination unit determines sub-carrier index, to which the modulation symbol of the first number having a maximum value of the first moving sum is allocated, as sub-carrier index to which the PLC preamble is allocated, and determines symbol index to which modulation symbol corresponding to first moving sum of the second number having a maximum value of the second moving sum as symbol index to which the PLC preamble is allocated.

17. The apparatus according to claim 11, wherein the primary number is 8, the predetermined interval is 3800, and the second number is 8.

* * * * *